(12) United States Patent
Razoumov et al.

(10) Patent No.: US 6,222,723 B1
(45) Date of Patent: Apr. 24, 2001

(54) ASYMMETRIC ELECTROCHEMICAL CAPACITOR AND METHOD OF MAKING

(75) Inventors: Serguei Razoumov; Arkadi Klementov; Serguei Litvinenko, all of Moscow; Alexey Beliakov, Kursk, all of (RU)

(73) Assignee: Joint Stock Company "Elton", Moscow (RU)

( * ) Notice: Subject to any disclaimer, the term of this patent is extended or adjusted under 35 U.S.C. 154(b) by 0 days.

(21) Appl. No.: 09/206,600

(22) Filed: Dec. 7, 1998

(51) Int. Cl.$^7$ .................................................... H01G 9/00
(52) U.S. Cl. ......................... 361/503; 361/502; 361/523
(58) Field of Search .................................. 361/502–510, 361/516–520, 522–523, 528, 529, 535, 536–538, 540, 541

(56) References Cited

U.S. PATENT DOCUMENTS

| | | |
|---|---|---|
| 3,648,126 | 3/1972 | Boos et al. . |
| 3,700,975 | 10/1972 | Butherus et al. . |
| 4,188,464 | 2/1980 | Adams et al. . |
| 4,363,079 | 12/1982 | Sekido et al. . |
| 4,414,607 | 11/1983 | Sekido et al. . |
| 4,438,481 | 3/1984 | Phillips et al. . |
| 4,562,511 | 12/1985 | Nishino et al. . |
| 4,709,303 | 11/1987 | Fujiwara et al. . |
| 4,731,705 | 3/1988 | Velasco et al. . |
| 4,737,889 | 4/1988 | Nishino et al. . |
| 5,079,674 | 1/1992 | Malaspina . |
| 5,106,709 | 4/1992 | Tekkanat et al. . |
| 5,161,094 | 11/1992 | Bruder et al. . |
| 5,368,717 | 11/1994 | Gottesfeld et al. . |
| 5,369,547 | 11/1994 | Evans . |
| 5,392,191 | * 2/1995 | Thomas et al. ....................... 361/508 |
| 5,429,893 | 7/1995 | Thomas . |
| 5,494,763 | 2/1996 | Behl et al. . |
| 5,527,640 | 6/1996 | Rudge et al. . |
| 5,538,813 | 7/1996 | Li . |
| 5,550,706 | 8/1996 | Kurzweil et al. . |
| 5,563,765 | * 10/1996 | Lian et al. ............................. 361/503 |
| 5,600,535 | * 2/1997 | Jow et al. ............................. 361/503 |

(List continued on next page.)

FOREIGN PATENT DOCUMENTS

| | | |
|---|---|---|
| 2094880 | 10/1997 | (RU) . |
| 871242 | 10/1981 | (SU) . |
| 92/12521 | 7/1992 | (WO) . |
| 94/19812 | 9/1994 | (WO) . |
| 95/21466 | 8/1995 | (WO) . |
| 95/23437 | 8/1995 | (WO) . |
| 97/07518 | 2/1997 | (WO) . |
| 97/07554 | 2/1997 | (WO) . |

OTHER PUBLICATIONS

Electrochemical Characterization of Activated Carbon–Fiber Cloth Polarizable Electrode s for Electric Double–Layer Capacitors; Tamaheshi, et al., J. Electrochem. Soc., vol. 137, No. 10, Oct. 1990.

Primary Examiner—Anthony Dinkins
Assistant Examiner—Eric Thomas
(74) Attorney, Agent, or Firm—Renner, Otto, Boisselle & Sklar, LLP

(57) ABSTRACT

An asymmetric electrochemical capacitor has at least a larger capacitance electrode and a smaller capacitance electrode, with an electrolyte therebetween. The larger capacitance electrode has a larger absolute capacitance than the smaller capacitance electrode. The capacitor thus has an overall capacitance which is approximately the absolute capacitance of the smaller capacitance electrode. The electrodes may be made of different materials, with the larger capacitance electrode made of the material having a larger specific capacitance. The larger capacitance electrode may thus be the same physical size as or smaller than the smaller capacitance electrode.

24 Claims, 2 Drawing Sheets

U.S. PATENT DOCUMENTS

| | | | |
|---|---|---|---|
| 5,621,609 | * | 4/1997 | Zheng et al. ......................... 361/503 |
| 5,705,259 | | 1/1998 | Mrotek et al. . |
| 5,737,181 | | 4/1998 | Evans . |
| 5,742,474 | | 4/1998 | Shimizu et al. . |
| 5,754,394 | | 5/1998 | Evans et al. . |
| 5,797,971 | * | 8/1998 | Zheng et al. ......................... 29/25.03 |
| 5,917,309 | | 6/1999 | Shimizu . |
| 5,920,455 | * | 7/1999 | Shah et al. ........................... 361/502 |
| 5,973,913 | * | 10/1999 | McEwen et al. ..................... 361/523 |

\* cited by examiner

US 6,222,723 B1

ASYMMETRIC ELECTROCHEMICAL CAPACITOR AND METHOD OF MAKING

TECHNICAL FIELD

The present invention relates generally to capacitors for storing electrical energy. More particularly, the invention relates to capacitors which store energy by electrochemical means and methods of making such capacitors.

BACKGROUND OF THE PRIOR ART

Capacitors are widely used devices for storing electrical energy. Among the various types of capacitors are electrochemical capacitors and electrolytic capacitors.

Electrolytic capacitors consist of series combinations of two capacitors (e.g. foil electrodes or plates), separated by an electrolyte, and between which a dielectric oxide film is formed adjacent to the surface of one or both of the electrodes.

Electrochemical capacitors consist of a series combination of at least two capacitors separated by an electrolyte. Each capacitor is formed by electrochemical processes (double layer charge storage or Faradaic pseudocapacitance charge storage) across an interface, such as the interface between an electrolyte and an electrode. Such capacitors rely on charge accumulation at the interface in order to store energy. Such capacitors do not rely on a dielectric oxide film for charge storage.

It is well known to produce electrochemical capacitors with electrodes made of carbon materials, with an electrolyte between the electrodes.

An important parameter in selection of capacitors is energy density. The energy density of a capacitor is the amount of energy stored per unit volume or mass of the capacitor. Among the desirable characteristics of capacitors is high energy density, since high energy density capacitors result in decreased capacitor mass and volume required for a given task.

Various approaches have been investigated to increase the energy density of electrochemical capacitors, while still allowing them to provide high power performance. One such approach has been to use non-aqueous electrolytes, which can increase operating voltage and thus energy density. However, non-aqueous electrolytes have low conductivity compared to aqueous electrolytes and thus lower power performance. Further, such electrolytes can be expensive, unstable, and prone to contamination by water and/or air.

From the foregoing is clear that a need exists for improved capacitor having large energy density and long service life.

SUMMARY OF THE INVENTION

An asymmetric electrochemical capacitor has at least a larger capacitance electrode and a smaller capacitance electrode, with an electrolyte therebetween. The larger capacitance electrode has a larger absolute capacitance than the smaller capacitance electrode. The capacitor thus has an overall capacitance which is approximately the absolute capacitance of the smaller capacitance electrode. The electrodes are made of different materials, with the larger capacitance electrode made of the material having a larger specific capacitance. The larger capacitance electrode may thus be the same physical size as or smaller than the smaller capacitance electrode. Such cells may be series connected.

According to one aspect of the invention, an asymmetric electrochemical capacitor includes a first electrode and a second electrode with an electrolyte therebetween, the first electrode being made of a different material than the second electrode, wherein the absolute capacitance of the first electrode has at least three times the absolute capacitance of the second electrode.

According to a particular embodiment of the invention, one of the electrodes uses a Faradaic process and the other electrode uses a non-Faradaic process. The electrode using a Faradaic pseudocapacitive process is made from a material selected from the group consisting of ruthenium, rhodium, palladium, osmium, iridium, cobalt, manganese, iron, platinum, tantalum, molybdenum, lead, tungsten, vanadium, electrically-conductive alloys, oxides, hydroxides, nitrides, and carbides of the same, metal hydride materials of $AB_2$ or $AB_5$ type, doped polymers, and combinations of the foregoing. The other electrode of the capacitor is made of a carbon material.

According to another aspect of the invention, a bipolar capacitance device includes two or more asymmetric electrochemical capacitor cells stacked together in series and bipolar conducting plates between adjacent pairs of the cells. Each of the capacitor cells includes a first electrode and a second electrode with an electrolyte therebetween, the first electrode being made of a different material than the second electrode, wherein the absolute capacitance of the first electrode has at least three times the absolute capacitance of the second electrode.

According to yet another aspect of the invention, a method of storing energy includes the steps of storing energy in a capacitor using an electrochemical process at a first electrode of the capacitor in contact with an aqueous electrolyte; and simultaneously storing energy in the capacitor using an electrochemical process at a second electrode of the capacitor in contact with the electrolyte, the second electrode being a different material than the first electrode, and the absolute capacitance of the first electrode being at least three times the absolute capacitance of the second electrode.

According to a further aspect of the invention, a method of creating a capacitor, comprising the steps of identifying a group of materials which are electrically conducting, which are able to reversibly store charge, and which have a capacitance per unit mass of at least 200 F/g; selecting a first material from the group of materials for use as a first electrode; selecting an electrolyte such that the first electrode is electrochemically stable in the electrolyte; and combining in a capacitor the first electrode made of the first material and a second electrode made of a carbon material, with the electrolyte therebetween, the first electrode having an absolute capacitance which is at least three times the absolute capacitance of the second electrode.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
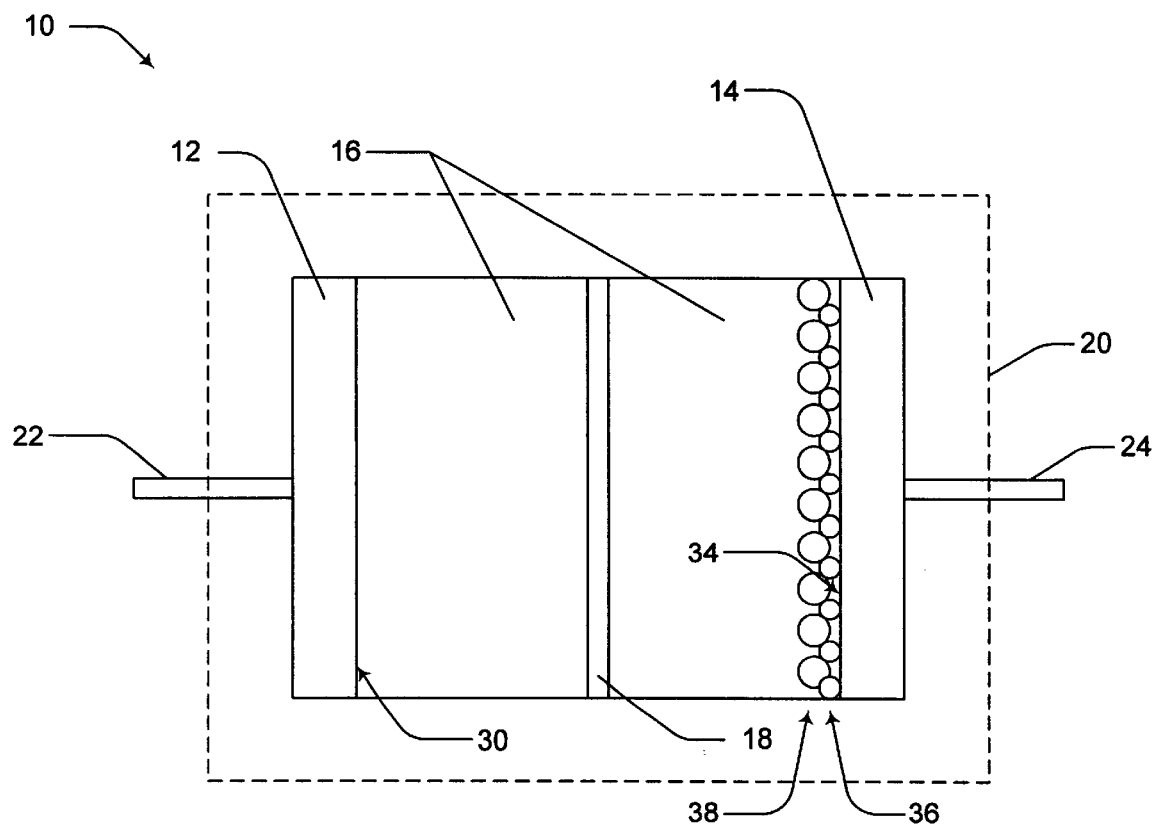
FIG. 1 is a schematic view of an asymmetric electrochemical capacitor cell in accordance with the present invention.

Referring to FIG. 1, an asymmetric electrochemical capacitor or capacitor cell 10 is shown. The capacitor or capacitor cell 10 has a larger capacitance first electrode 12 and a smaller capacitance second electrode 14, with an electrolyte 16 therebetween. A separator 18 separates the electrodes 12 and 14. The internal components of the capacitor 10 are stored in a casing 20. Respective leads 22 and 24 are attached to the electrodes 12 and 14.

The asymmetry between the capacitance values of the electrodes 12 and 14 allows increased energy density for the asymmetric electrochemical capacitor 10 as compared to conventional symmetric electrochemical capacitors. The total capacitance $C_T$ of an electrochemical capacitor is the inverse of the sum of the absolute capacitances $C_1$ and $C_2$ of its component electrodes:

$$1/C_T = 1/C_1 + 1/C_2 \qquad (1)$$

The absolute capacity of an electrode is the product of the capacitor's specific gravimetric capacity and its mass, or of its specific volumetric capacity and its volume.

For a symmetric capacitor, where $C_1$ and $C_2$ are equal, the total capacitance of the capacitor is half the capacitance of one of the electrodes.

However, as the absolute capacitance of one of the electrodes is increased, the total capacitance of the capacitor approaches the capacitance of the smaller capacitance electrode. Thus an asymmetric capacitor may have effectively double the capacitance value when compared to a symmetric capacitor. Since the energy stored by an electrochemical capacitor is directly proportional to its capacitance, doubling the capacitance value doubles the energy stored by the capacitor.

Preferably, the larger capacitance electrode 12 has a capacitance at least three times that of the smaller capacitance electrode 14. More preferably, the larger capacitance electrode 12 has a capacitance at least ten times that of the smaller capacitance electrode 14.

The difference in absolute capacitance is achieved by using different materials for the two electrodes, with one of the electrodes having a greater specific capacitance (capacitance per unit mass or per unit volume) than the other. In the illustrated embodiment, which is described in greater detail below, one of the electrodes is made of a metal or conductive metal oxide or hydroxide while the other electrode is made of activated carbon. Specific capacitance of typical carbon electrode materials is on the order of approximately 10 to 200 F/g. Typical metal oxide and hydroxide electrode materials have larger specific capacitance, on the order of approximately 100 to more than 1000 F/g.

In the illustrated embodiment the larger capacity electrode 12 is made of a high specific capacity material that exhibits Faradaic pseudocapacitive behavior. Exemplary high specific capacity materials include ruthenium, rhodium, palladium, osmium, iridium, cobalt, manganese, iron, platinum, lead, tantalum, molybdenum, tungsten, vanadium, electrically-conductive alloys, oxides, hydroxides, nitrides, and carbides of the same, metal hydride materials of $AB_2$ or $AB_5$ type, doped conducting polymers, and combinations of the foregoing.

Preferably the high specific capacitance material has a capacitance per unit mass of at least 200 F/g. More preferably the specific capacitance is at least 300 F/g. Even more preferably, the specific capacitance is at least 500 F/g. It will be appreciated that increased specific capacitance allows achievement of the same absolute capacitance with a smaller weight electrode. Lower-weight electrodes lead to lower-weight capacitors with increased energy density and power density.

It is also desirable for the high specific capacitance material to have a large surface area per unit mass. Preferably, the high specific capacitance material has a surface area per unite mass of at least 10 $m^2/g$. More preferably, the surface area per unit mass is at least 100 $m^2/g$.

Further information regarding metal hydrides may be found in Chapter 33 of "Handbook of Batteries," 2d ed., by David Linden, McGraw-Hill (1995), which is incorporated herein by reference.

Further information regarding Faradaic pseudocapacitive materials may be found in B. E. Conway, "Transition from 'Supercapacitor' to 'Battery' Behavior in Electrochemical Energy Storage," 138 J. Electrochem. Soc., No. 6, pp. 1539–1548 (June 1991). Further information on the use of doped conducting polymers may be found in Rudge et al., "Conducting Polymers As Active Materials in Electrochemical Capacitors", Second International Seminar on Double Layer Capacitor and Similar Energy Stage Devices, Dec. 7–9, 1992. Both of the above are herein incorporated by reference in their entireties.

The Faradaic pseudocapacitive process that occurs at the larger capacity electrode 12 of some of the listed materials involves progressive oxidation/reduction reactions at an interface 30 between the electrode 12 and the electrolyte 16. These reactions are attributable to surface and sometimes bulk electrochemical processes. They are observed when a material undergoes kinetically and/or thermodynamically reversible singular or multiple redox processes over a wide potential range. Charge transfer at the larger capacity electrode 12 is the result of these primary, secondary, tertiary, and higher order oxidation/reduction reactions. Energy is stored and released by the reduction of the oxidized species, and its subsequent oxidation, similar to some conventional rechargeable battery cell electrodes.

The Faradaic pseudocapacitive process of the doped conducting polymers involves insertion of electrolyte ions into the polymer structure.

The Faradaic pseudocapacitive process of the metal hydrides involves storage of hydrogen atoms on the material's surface and in its bulk.

The Faradaic pseudocapacitive process in the electrode 12 occurs over a relatively wide voltage range for the capacitor 10.

The smaller capacitance electrode 14 stores charge primarily using a double layer electrochemical mechanism. The smaller capacitance electrode 14 may include a carbon material such as activated carbon, petroleum coke, vitreous carbon, carbon black, synthetic carbon fibers or combinations thereof. The electrode 14 is in contact with the electrolyte 16, at an interface 34. The double layer forms as a layer of ions at the interface 34 when a voltage potential is applied between the two electrodes.

On the electrode side of the interface 34 a layer of electrons 36 forms. On the opposite side of the interface 34, the electrolyte side, a layer of positive ions 38 forms. Together, these two layers are the double layer which store energy. The voltage across the interface 34 increases with charge accumulation. In connection with the double layer capacitance phenomena, no charge transfer (Faradaic) process occurs at the electrode/electrolyte interface 34. During discharge, the charge stored at the interface is released. The charge/discharge rate is generally determined by the nature and type of the material, its thickness, and the electrolyte. High surface area carbon, such as disclosed above, is used to achieve high energy storage capability.

The electrolyte 16 is an aqueous electrolyte in the illustrated embodiment. Exemplary aqueous electrolyte materials are solutions of alkali metal carbonates or hydroxides, potassium hydroxide, lithium hydroxide, perchloric acids, or sulfuric acid.

Although the illustrated embodiment utilizes an aqueous electrolyte, it will be appreciated that non-aqueous electrolytes may alternatively be used with other types of electrodes.

For example, if it uses tetramethylammonium and difluoromethane sulphonate as the non-aqueous electrolyte, it is possible to use a p-doped conducting polymer, such as polythiophene, for the positive electrode, the electrode having larger capacitance; and a negative electrode made of carbon material. Alternatively, for this kind of electrolyte, it is possible to use an n-doped conducting polymer (polythiophene) for the negative electrode, in this case having larger capacitance; and a positive electrode made of carbon material.

In both of the above cases, one of the electrodes has an absolute capacitance three and more times that of the other electrode.

In exact construction, use of a doped polymer electrodes instead of carbon electrodes allows a decrease in the mass of the capacitor and allows a higher energy density to be reached. The carbon electrode has a high level of conductivity and allows a decreased internal resistance of capacitor and an increased power density.

But in any case, using the asymmetric concept, service life during cycling will be longer as compared with a symmetric design because the voltage swing of the electrode having larger capacitance is less when compared to that of a symmetric capacitor.

The separator 18 is an ion-permeable material such as ion-permeable membrane, a microporous material or an ion-conducting material. Exemplary materials for such a separator are paper, microporous hydrophilic plastic films, and glass felts. The separator may be an ion-conducting solid material. An exemplary separator may be 0.001" thick.

The separator may be a material which absorbs electrolyte. Such a electrolyte-absorbing separator may fill substantially the entire volume between the electrodes.

It will be appreciated that current collector grids, expanded metal, meshes and foils or scintered matrixes may be employed in the electrode assembly if desired. It will further be appreciated that asymmetric electrochemical capacitors may be constructed without separators, for instance with a physical separation between electrodes or solid electrolyte.

The illustrated embodiment, a double layer carbon electrode used in combination with a metal hydroxide pseudocapacitive electrode, has been found to operate up to a maximum voltage of 1.7–1.8 V. This is almost double the operating voltage of some commercially available symmetric electrochemical capacitors using aqueous electrolytes. This increased operating voltage provides increased energy density for the illustrated embodiment, since energy density is proportional to the square of the operating voltage.

In the illustrated embodiment, the larger capacitance electrode is made of a material having a larger specific capacitance when compared to the material of the smaller capacitance electrode. Therefore despite having a larger absolute capacitance, the larger capacitance electrode may have less volume and/or may weigh less than the smaller capacitance electrode.

The larger capacitance electrode 12 experiences a small voltage swing as compared with the smaller capacitance electrode 14 during charging and discharging of the device. This is because the difference in the capacitances of the electrodes 12 and 14, in that the stored charges $Q_1$ and $Q_2$ for the electrodes are identical. Since $Q_1=C_1\Delta V_1=Q_2=C_2\Delta V_2$, where $\Delta V_1$ and $\Delta V_2$ are voltage changes, and since $C_1>>C_2$, $\Delta V_1<<\Delta V_2$. This small voltage swing on the larger capacitance electrode 12 leads to long life for that electrode, since large voltage swings on electrodes using Faradaic processes leads to shorter electrode cycle life.

An asymmetric electrochemical capacitor according to the present invention offers other practical advantages. It has an increased device energy density when compared with symmetric capacitors. In part this is because the asymmetric electrochemical capacitor allows the full capacitance value of the smaller capacitance value electrode to be realized. Further this is because operation can occur above 1.2 V using an aqueous electrolyte.

The use of an aqueous electrolyte may result in much higher power performance than for an organic electrolyte (approximately 50 times the conductivity). Aqueous electrolytes are also lower in costs than organic electrolytes, and are non-flammable. Further, use of aqueous electrolytes results in lower manufacturing costs, since, unlike for capacitors with organic electrolytes, dry, oxygen-free environments are not needed, and special vacuum drying chambers are not needed to prepare capacitor materials.

The increased device energy density of the asymmetric design means that a lesser quantity of construction materials is needed for a given energy value device—less separator, less packaging materials, less active materials, and less current collector is required. This results in a lower cost per unit of energy stored.

As compared with batteries, an asymmetric capacitor of the present invention exhibits higher charge/discharge cycle life and faster charging. Typical batteries are limited to on the order of 1,000 charge/discharge cycles and require charge times of 30 minutes to 10 hours. Electrochemical capacitors such as those of the present invention may have a cycle life in excess of 100,000 cycles, and be charged in a few seconds or minutes.

Another advantage of the asymmetric electrochemical capacitor is that the high energy density of such devices may be maintained when the devices are in high-voltage series strings. Each cell in the string of series-connected capacitors operates at the single-cell voltage. The string is inherently balanced, so there is no need for external circuit balancing as is commonly done in the prior art.

Figure 2:
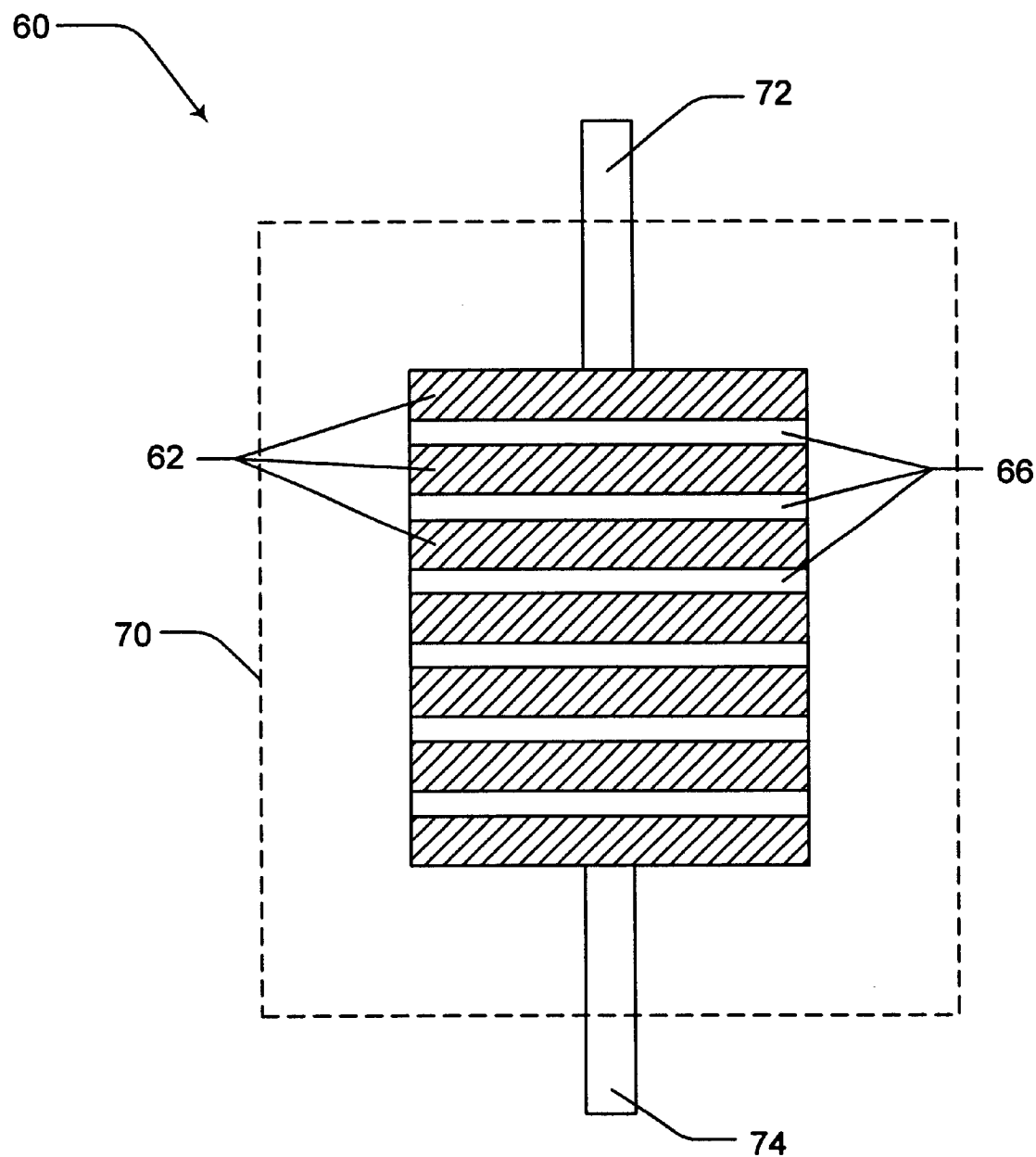
FIG. 2 is a schematic view of a bipolar series-connected stack of asymmetric capacitor cells.

FIG. 2 shows such a high-voltage series capacitor 60. The capacitor 60 utilizes a bipolar configuration. It includes a number of asymmetric electrochemical capacitor cells 62 stacked and connected in series via bipolar conducting plates 66 between each pair of adjacent cells.

The capacitor cells 62 may be similar to the asymmetric electrochemical capacitor 10 described above, or may have any of the variations described above. The cells preferably will all have similar operating voltages and other operating characteristics.

Adjacent of the capacitor cells 62 are arranged having the same orientation. That is, the anode of one cell is adjacent to the cathode of the adjacent cell, and vice versa.

The bipolar conducting plates 66 are made of a material which conducts electrons but is impermeable to ions. Such materials are well known in the art, and include glassy carbon, conductive butyl rubber, and a variety of metals.

The cells 62 are in a casing 70. Leads 72 and 74 are connected to the end cells. The leads 72 and 74 protrude from the casing 70 for external connection.

It will be appreciated that a high-voltage series capacitor may also be obtained by connecting a number of separate capacitor cells together in series without using a bipolar configuration.

The following examples illustrate the present invention:

EXAMPLE 1

A capacitor had a carbon negative electrode, an aqueous electrolyte, and a lead oxide positive electrode. The carbon negative electrode had a woven or powder material of activated carbon with specific surface area of 900–1100 $m^2/g$. The carbon electrode thickness was 0.12 cm, and it had a 36 $cm^2$ geometric area. The positive electrode had a base of lead plate with a thickness of 0.02 cm, containing lead dioxide as the active material. The overall thickness of the positive electrode was 0.04 cm and its capacity was 0.34 Ah.

The electrolyte was an aqueous solution of sulfuric acid with a density of 1.26 $g/cm^3$.

A lead plate with a thickness of 0.02 cm was used as a current collector for the negative (carbon) electrode.

The volume of the cell was 6.84 $cm^3$. The cell's capacity was 770 F (113 $F/cm^3$) within a voltage range of 1.6–0.8 V.

The capacity for this capacitor compares favorably with a symmetric capacitor having a sulfuric acid electrolyte and identical carbon electrodes of the same type as those described above. Such a symmetric capacitor had a volume of 10.44 $cm^3$, and a capacity of 392 F (37.5 $F/cm^3$) within a voltage range of 1.0–0.0 V Thus the absolute capacity of the asymmetric capacitor was approximately twice that of its symmetric counterpart. The capacity per unit volume of the asymmetric electrochemical capacitor was approximately triple that of a comparable symmetric electrochemical capacitor. The corresponding volumetric energy density of the asymmetric capacitor was 108 $J/cm^3$. For the symmetric capacitor it was 18.8 $J/cm^3$. Thus, the invention provides 5.7 times higher volumetric energy density.

EXAMPLE 2

The capacitor of Example 1 is repeated with the following changes. The carbon electrode was used as the positive electrode. The negative electrode had a base of lead plate with a thickness of 0.02 cm, containing metal lead as the active material The overall thickness of the negative electrode was 0.03 cm, and its capacity was 0.4 Ah.

The volume of the cell was 6.48 $cm^3$. The cell's capacity was 780 F (120 $F/cm^3$) within a voltage range of 1.2–0.1 V.

Thus, the asymmetric design offer more energy density compared with symmetric design.

EXAMPLE 3

The capacitor was constructed using a positive electrode made of fiber or powder carbon material with specific surface area of 1400 $m^2/g$ and with a thickness of 0.55 mm. The negative electrode was dry rolled metal hydride material ($LaNi_5$ base formula) with a thickness of 0.2 mm and having a specific capacity of 0.9 $Ah/cm^3$. The electrolyte was potassium hydroxide aqueous solution, density 1.28 $g/cm^3$. The separator between the anode and cathode electrodes was a non-woven polyvinylchloride felt with a thickness of 0.22 mm.

Several pairs of positive and negative electrodes, with separators and electrolyte, were enclosed in a metal casing having dimensions of 50×24×11 mm and were sealed therein. This capacitor had a maximum cell working voltage of 1.4 V and a capacity per unit volume of 44 $F/cm^3$. In comparison, the capacity of a symmetric carbon-carbon capacitor having the same dimensions was 21 $F/cm^3$ in the voltage window of 1.0 to 0.5 V.

Other metal hydride negative electrode materials should provide comparable energy density advantages in the asymmetrical electrochemical capacitor. These hydrides include all materials of the $AB_5$ and $AB_2$ type. Again, the key is to have a large difference in absolute capacitance between the two electrodes.

Using the above information, a method of creating a capacitor may be utilized. A group of high specific capacitance materials may be identified which are electrically conducting, and which are able to reversibly store charge (such as by use of a pseudocapacitive Faradaic process). Exemplary high specific capacitance materials have been listed earlier.

A material from the group is selected for use as a first electrode. Many factors are involved in the selection of the material, including cost, availability, specific capacity, surface area per unit mass, electrical conductivity, and compatibility with the electrolyte and other materials.

In conjunction with the selection of a material for the first electrode, an electrolyte is selected such that the first electrode is electrochemically stable in the electrolyte. It will be appreciated that alternatively either the electrolyte or the first electrode material may be selected first, and the other selected to be compatible.

Finally the first electrode and a second electrode made of a carbon material (such as the exemplary carbon materials described earlier) are combined with the electrolyte therebetween, thereby forming an asymmetric capacitor. The first electrode preferably has an absolute capacitance which is at least three times that of the second electrode. More preferably the first electrode has an absolute capacitance at least ten times that of the second electrode.

The invention therefore includes electrochemical capacitors having a pair of electrodes with unequal absolute capacitances, and an electrolyte between the electrodes. If the ratio of the capacitances of the two electrodes is large enough, the capacitance of the asymmetric electrochemical capacitor approaches the capacitance of the lower capacitance electrode. Thus the asymmetric electrochemical capacitor has at least double the capacitance of a comparable symmetric electrochemical capacitor having both electrodes similar to the lower capacitance electrode of the asymmetric capacitor. Because high capacitance density material is used for the higher capacitance value electrode in the asymmetric approach, further energy density advantages are possible, as shown in the foregoing examples.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of e other embodiments, as may be desired and advantageous for any given or particular application.

What is claimed is:

1. An asymmetric electrochemical capacitor comprising a first electrode and a second electrode with an electrolyte therebetween, the first electrode being made of a different material than the second electrode, wherein the absolute capacitance of the first electrode has at least three times the absolute capacitance of the second electrode.

2. The capacitor of claim 1, wherein the absolute capacitance of the first electrode is at least ten times the absolute capacitance of the second electrode.

3. The capacitor of claim 1, wherein the electrolyte is an aqueous electrolyte.

4. The capacitor of claim 3, wherein the aqueous electrolyte is selected from the group consisting of solutions of potassium hydroxide, sodium hydroxide, lithium hydroxide, sulfuric acid, or perchloric acid.

5. The capacitor of claim 1, wherein the electrolyte is a non-aqueous electrolyte.

6. The capacitor of claim 1, wherein one of the electrodes stores energy using a Faradaic pseudocapacitive process and the other electrode stores energy using a non-Faradaic process.

7. The capacitor of claim 6, wherein the first electrode is the electrode using the Faradaic pseudocapacitive process.

8. The capacitor of claim 1, wherein one of the electrodes includes a carbon material and the other electrode includes a Faradaic pseudocapacitive charge storage material.

9. The capacitor of claim 8, wherein the first electrode is the electrode using the Faradaic pseudocapacitive material.

10. The capacitor of claim 9, wherein the Faradaic pseudocapacitive material is selected from the group consisting of ruthenium, rhodium, palladium, osmium, iridium, cobalt, lead, manganese, iron, platinum, tantalum, molybdenum, tungsten, vanadium, electrically-conductive alloys, oxides, hydroxides, nitrides, and carbides of the same, metal hydride materials of $AB_2$ or $AB_5$ type, doped conducting polymers, and combinations of the foregoing.

11. The capacitor of claim 8, wherein the carbon material is selected from a group consisting of activated carbon, synthetic carbon fibers, carbon black, petroleum coke, vitreous carbon, or combinations thereof.

12. The capacitor of claim 1, wherein the first electrode has a larger specific capacitance than the second electrode.

13. The capacitor of claim 1, wherein the volume of the first electrode is less than or equal to the volume of the second electrode.

14. The capacitor of claim 1, wherein the mass of the first electrode is less than or equal to the mass of the second electrode.

15. The capacitor of claim 1, wherein one of the electrodes includes a carbon material and the other electrode includes an organic p- or n-doped conducting polymer.

16. The capacitor of claim 15, wherein the first electrode includes the organic p- or n-doped conducting polymer.

17. The capacitor of claim 16, wherein the carbon material is selected from a group consisting of activated carbon, synthetic carbon fibers, carbon black, petroleum coke, vitreous carbon, or combinations thereof.

18. A bipolar capacitance device comprising:

two or more asymmetric electrochemical capacitor cells stacked together; and bipolar conducting plates between adjacent pairs of the cells;

wherein each of the capacitor cells includes a first electrode and a second electrode with an electrolyte therebetween, the first electrode being made of a different material than the second electrode, wherein the absolute capacitance of the first electrode has at least three times the absolute capacitance of the second electrode.

19. The capacitor of claim 18, wherein one of the electrodes includes a carbon material and the other electrode includes a Faradaic pseudocapacitive material.

20. The capacitor of claim 18, wherein one of the electrodes stores energy using a Faradaic process and the other electrode stores energy using a non-Faradaic process.

21. A method of storing energy comprising the steps of:

storing energy in a capacitor using an electrochemical process at a first electrode of the capacitor in contact with an aqueous electrolyte using an electrochemical process; and simultaneously storing energy in the capacitor using an electrochemical process at a second electrode of the capacitor in contact with the electrolyte, the second electrode being a different material than the first electrode, and the absolute capacitance of the first electrode being at least three times the absolute capacitance of the second electrode.

22. The method of claim 21, wherein the storing energy at the first electrode includes storing energy using a Faradaic pseudocapacitive process.

23. The method of claim 21, wherein the storing energy at the second electrode includes storing energy using a non-Faradaic process.

24. The method of claim 21, wherein the capacitor includes two or more capacitor cells connected in series with bipolar conducting plates between pairs of adjacent cells, each of the cells having electrodes with substantially the same operating characteristics.

* * * * *